United States Patent [19]

Ferris, III et al.

[11] Patent Number: 4,591,973
[45] Date of Patent: May 27, 1986

[54] INPUT/OUTPUT SYSTEM AND METHOD FOR DIGITAL COMPUTERS

[75] Inventors: Fred O. Ferris, III, Falls Church, Va.; Harri G. Prival, Potomac, Md.

[73] Assignee: Sperry Corporation, New York, N.Y.

[21] Appl. No.: 501,232

[22] Filed: Jun. 6, 1983

[51] Int. Cl.⁴ .............................................. G06F 13/32
[52] U.S. Cl. ...................................................... 364/200
[58] Field of Search ... 364/200 MS File, 900 MS File

[56] References Cited

U.S. PATENT DOCUMENTS

| | | | |
|---|---|---|---|
| 3,934,232 | 1/1976 | Curley | 364/200 |
| 4,133,030 | 1/1979 | Huettner | 364/200 |
| 4,156,907 | 5/1979 | Rawlings | 364/200 |
| 4,188,665 | 2/1980 | Nagel | 364/200 |
| 4,200,930 | 4/1980 | Rawlings | 364/200 |
| 4,204,253 | 5/1980 | Hanenberg | 364/200 |
| 4,319,336 | 3/1982 | Anderson | 364/200 |
| 4,418,382 | 11/1983 | Larson | 364/200 |

Primary Examiner—James D. Thomas
Assistant Examiner—Florin Munteanu
Attorney, Agent, or Firm—Howard P. Terry; Martin G. Anderson

[57] ABSTRACT

An input/output (I/O) system and method for coupling a host computer to a plurality of peripheral devices in which data destined for peripheral devices is transferred to an output data buffer whose locations are paired with output channel addresses stored in an output device table. A microcomputer performs any processing required on data stored in the output data buffer by reading the address and a function code in the output device table then distributes processed data to an output device block whose locations are addresses of output channels. An input data buffer and input device table similarly arranged, collects and processes input data continuously, which input data buffer can be transferred to the host computer, on command, in a high speed burst.

3 Claims, 2 Drawing Figures

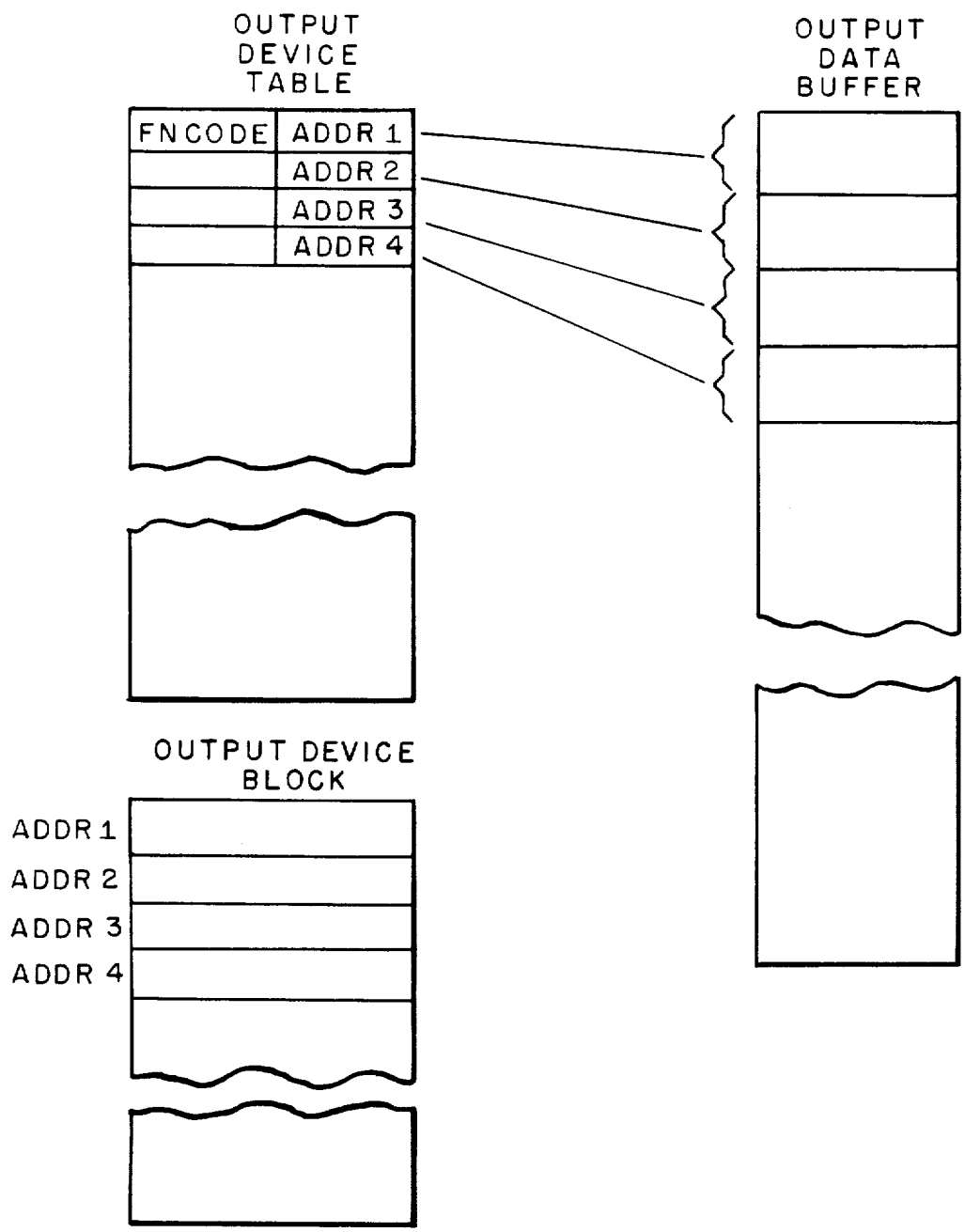
F I G. 2.

INPUT/OUTPUT SYSTEM AND METHOD FOR DIGITAL COMPUTERS

BACKGROUND OF THE INVENTION

1. Field of the Invention

This invention pertains to the transfer of high speed bursts of data from a host computer to a plurality of peripheral devices.

2. Description of the Prior Art

Input/output peripheral devices such as digital to analog converters have traditionally been connected to digital computer through special purpose controllers. One or more computer memory addresses are generally assigned to each peripheral device. Where large numbers of input/output channels are required such as in flight simulators or manufacturing processes each peripheral has had its own hardware dedicated address. Such a system is inefficient because a large share of the computer's resources must be devoted to data acquistion and control of peripheral devices. To relieve the computer, commonly called the host computer, from performing input/output operations various microprocessor based devices have been developed to handle input/output operations. Such devices commonly called front-end processors and intellegent peripheral controllers have increased real time system performance by providing greater throughput (the amount of data that the system can handle in a given time) and faster response time (the time needed to perceive and react to an event). The present invention in addition to providing increased system performance is capable of accepting high speed bursts of data from a host computer, further processing the data to be transferred, then distributing the processed data to a large number of peripheral devices. Further, the present invention is capable of assigning data to selected periperhal devices under instructions from the host computer which may be varied dynamically during system operation or may be input by a system operator from a control terminal.

SUMMARY OF THE INVENTION

The present invention is an input/output (I/O) system and method for coupling a host computer to a plurality of peripheral devices. Data to be transferred from the host computer to peripheral devices is written by the direct memory access technique to an output data buffer which is a dedicated block of memory in the programmable I/O system. From the output data buffer data is transferred, under program control, of a microcomputer in the programmable I/O system to the specific addresses of each peripheral device.

Associated with the output data buffer is an output device table. Each word in the output device table is paired with a word in the output data buffer. The output device table is a list of addresses of the peripheral devices to which the data in the corresponding address of the output data buffer is to be sent. The output device table may be contained in read-only-memory or may be loaded by the host computer upon system initialization. The output device table may also be loaded "off-line" via a terminal device and may be dynamically varied by the host computer during system operation. A portion of each word in the output device table is required for peripheral device address. Another portion of each word in the output device table is used as a function code to specify the type of processing to be performed on the data in each word in the output data buffer before the data is transferred to the specified output address. Each function specified by the function code is performed by a separate sub-routine which is identified by the function code. The sub-routines for processing data from the host computer are stored in read only memory and are executed upon completion of an output data transfer from the host computer to the output data buffer. Transfer of input data from peripheral devices to the host computer proceeds as follows: The microcomputer 13 continuously reads input data from peripheral devices as specified by the input device table in memory 12. This data is then loaded into the input data buffer in memory 12 for access by the host computer. This operation is continuous unless the microcomputer is interrupted by a higher priority task such as output data processing.

In addition to output and input data processing and transfer, the input/output system is also capable of performing input/output testing, and system monitoring. Input/output testing may also be initiated by an interrupt from the host computer or it may be initiated by a Systems Operator from a terminal. When initiated, the input/output test program first identifies each peripheral device attached to the system as to type by reading the identification bits in the command and status register location associated with each peripheral device, it then performs loop-back testing of each bit of each input/output address. When an error is encountered, one particular bit is set in a block of memory called the error buffer. Each bit in this buffer is associated with one of the input/output device addresses. Upon completion of the test function, the host computer is signalled and can then initiate an error buffer read to localize the problem to a single input/output channel.

The system monitor allows operation and testing of the programmable I/O system while it is disconnected from the host computer. Using a terminal device and the system monitor an operator can display and modify the contents of memory, perform input/output testing, execute input and output processing and enter and run user programs.

BRIEF DESCRIPTION OF THE DRAWINGS

FIG. 2 is a block diagram of the output device table, output data buffer and output device block contained in the memory.

DESCRIPTION OF THE PREFERRED EMBODIMENT

Figure 1:
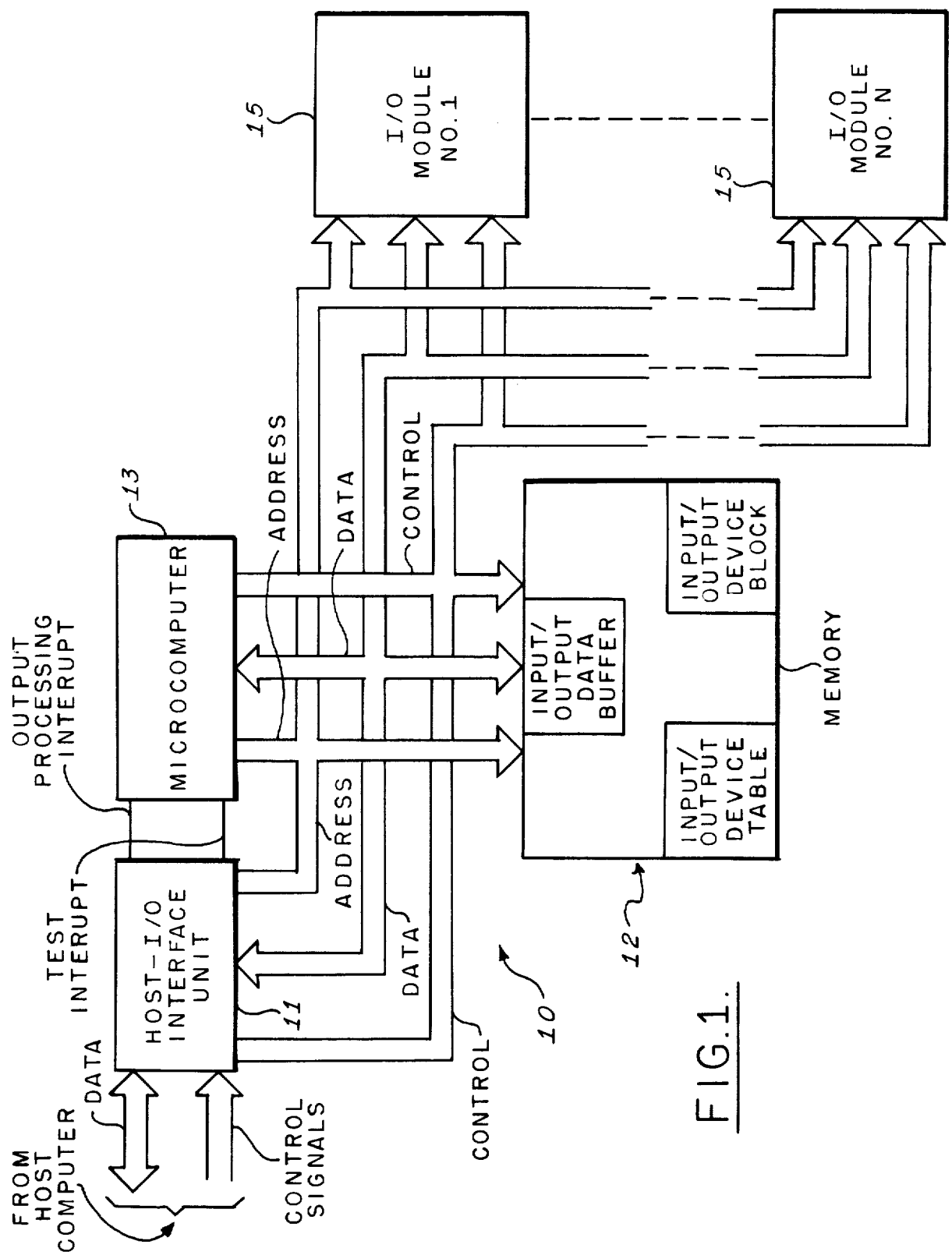
FIG. 1 is a block diagram of the I/O systems.

The input/output (I/O) system 10 is capable of performing the following functions: output data processing and distribution, input data collection and processing, Input/Output testing, and system monitoring.

A microcomputer 13 of a general design well known in the art which may include an Intel 8086 microprocessor is connected in a conventional manner to perform the functions described herein. The microcomputer is coupled to receive data, address, control and interrupt signals from a host computer. The microcomputer is further coupled to provide data and control signals to the host computer and data, control and address signals to a memory and to a plurality of I/O modules. The memory is of a type also well known in the art and contains both read only memory and random access memory. The read-only-memory contains a plurality of programs which support the operation of the I/O system 10 including input and output processing programs and their function sub-routines, an I/O test program, and a system monitor program. A block of the random access memory in the I/O system 10 is defined as the output data buffer. It is into this block of memory in memory 12 that the host computer (not shown) transfers, in high speed bursts, output data destined for peripheral devices. Associated with the output data buffer is an output device table which consists of a block of consecutive memory locations in memory 12. Each word in the output device table is paired with a word in the output data buffer. The output device table is a list of memory mapped addresses of I/O channels to which the data in the output data buffer is to be sent. The outut device table may be contained in read-only-memory or may be loaded by the host computer upon systems initialization and may be varied during system operation to obtain a desired output. The output device table may also be loaded when the system is "off-line" through a terminal (not shown). The addresses of all output devices coupled to the I/O system 10 are preferably confined to the top 1024 addresses in memory, hence only the 10 least significant bits of the device address appear in the output device table, since the six most significant bits are always all 1's. Since only the 10 least significant bits of each word in the output device table are required for device address specification, the 6 most significant bits are used as a function code to specify the type, if any, of processing to be performed on the data in each word in the output data buffer before transferring it to the specified output address. For example, one function code may instruct the microcomputer 13 to regard the number in an output buffer word as a floating point number in the host computer's floating point format, and to convert this number to a fixed point integer before transmitting it to its output device. Another function code may specify that the 16 most significant bits in an output data buffer be regarded as a value, $x_1$, and that the function $$Y_1 = a_I X_I + b_i$$

be computed where $a_I$ and $b_I$ are constants stored in a table of constants in the memory, before $Y_I$ is transmitted to the output device. Another function code may require the microcomputer 13 to scale a certain number of significant bits of the associated data buffer word according to a specified formula. Each function specified by the six bit function code is performed by a separate sub-routine specified by the function code. Thus, additional processing functions may be added by adding the required sub-routines in memory 12. The I/O system may be made compatible with various host computers that support high speed burst data transfers by suitable design of the I/O system interface unit 11. The I/O system interface unit 11 accepts bidirectional high speed burst data from the host computer and accepts the following discrete control signals from the host computer: input acknowledge, output data ready, external function, input status acknowledge, last word flag, I/O reset, terminated device. The I/O system interface unit provides the following discrete control signals to the host computer: input data ready, output acknowledge, external function acknowledge, input status ready, external terminate, external mode, device present and device end of block.

In response to the control signals the I/O system interface unit initiates operations of the I/O system which include:

Input Data Buffer—transfers the contents of the input data buffer in the memory 12 of the I/O system 10 to a block of memory in the host computer; Output Data Buffer—transfers data from a block of memory in the host computer to the output data buffer in the memory 12 of the I/O system 10. When the transfer of data from the host computer to output data buffer in the I/O system 10 is complete, the I/O system interface unit 11 issues an interrupt signal to the microcomputer 13 causing output processing of data in the output data buffer and transfer of the processed data to selected peripheral devices; Input/Output Device Table Read/Write—initially used during system set-up to transfer input and output device tables from the host computer to the input and output device table locations in the memory 12 of the I/O system 10. During system operation the host computer may vary the input/output device tables to provide a desired output to selected peripheral devices; Constants Table Read/Write—used to calibrate or change calibration of an I/O channel on which the calibration function $y_I = a_I x_I + b_I$ is performed; Error Buffer Read—transfers contents of the error buffer in the memory 12 of the I/O system to the host computer. The Error Buffer contents correspond to I/O channels that did not pass the I/O test; I/O Test—provides an interrupt to microcomputer 13 to execute a program for testing each I/O channel on the system. The logic and switching components required in the I/O system interface unit 11 are specific to the host computer used and can be readily constructed by those skilled in the art to provide the functions described herein.

Associated with the microcomputer and its memory are a plurality of input/output (I/O) modules. Each of these modules appears as a sequence of addresses in I/O device block in the memory 12 of the I/O system 10. Each I/O module has the capability of coupling its output back to its input for performing a detailed "loop back" test of each I/O channel. The input/output (I/O) modules are of designs well known in the art and may include, but are not limited to the following types: digital input module, digital output module, analog output module, analog input module, and peripheral driver module. By providing each I/O module with a control status address located 1024 words below the first address assigned to that module, it is possible to automatically identify which I/O channels are actually populated by I/O modules and what the module type is. The control/status word contains a coded module identification field, which when read, identifies the module type.

The operation of each function performed by input/output system 10 will now be described.

Output Data Processing: After data has been transferred from the host computer to the output data buffer in the I/O system 10, the host computer (not shown) issues an output processing interrupt signal to microcomputer 13.

Upon receipt of the output processing interrupt in the microcomputer 13 proceeds as follows in accordance with the output processing program in the Appendix. It reads the first word in the output device table. If the function code is not the "return" code, it jumps to a subroutine specified by the function code. This subroutine transfers the data in the first word of the output data buffer to the output address specified in the output device table, after the required processing. The next word in the output device table is then read and the process repeated. When a "return" function code is read, the process ends and the microcomputer returns to input processing. One function code is provided that allows a user to compose his own program or routine. When this code is encountered, the output processing program takes as the starting address of the user program, the most significant half of the corresponding word pair in the output data buffer. The feature allows the computational power of the microcomputer to augment that of the host computer.

Input Data Processing: Input processing takes place in a similar manner in accordance with the input processing program in the Appendix. Input data from peripheral devices are read, processed by microcomputer 13 and transferred to an input data buffer whose addresses are paired with addresses in an input device table. Input processing is continuous unless the microcomputer 13 receives an interrupt signal from the I/O system interface unit 11. If an interrupt signal is received, microcomputer 13 executes the program specified by the interrupt signal and then returns to input processing. Whenever input data is required by the host computer it initiates, by the direct memory access technique, a transfer of input data from the input data buffer.

I/O Testing: The I/O test is performed to verify the integrity of the I/O modules 15. I/O testing can be initiated by the host computer when the system is operating or by a System Operator when the I/O system 10 is off-line.

When initiated, by a test interrupt signal the I/O test program clears any previous error indications in the Error Buffer. It then proceeds to test each I/O module, logging any errors encountered. As each module is tested, the external inputs or outputs are disconnected by relays either mechanical or electronic on the I/O modules. When testing of an output card is complete, the outputs are set to zero, and the external lines are reconnected. When all I/O modules have been tested, the test program supplies the "Test Done" signal to the host computer, and exits back to the Input Processing mode. Errors are reported to the host computer by setting bits in the Error Buffer, a 64-word block of memory in memory 12. Each of the possible I/O channels has a corresponding bit in the Error Buffer.

System Monitor: The system monitor enables an operator to test and operate the programmable I/O system through a terminal device (not shown) while in an off-line mode. The capabilities of the system monitor include displaying and modifying the contents of memory, performing input/output testing, executing input/output processing programs and entering and running user programs.

While the invention has been described in its preferred embodiments, it is to be understood that the words which have been used are words of description rather than of limitation and that changes may be made within the purview of the appended claims without departing from the true scope and spirit of the invention in its broader aspects.

We claim:

1. An input/output (I/O) system that selectively couples a host computer to a plurality of external peripheral devices, said host computer having a memory with a plurality of locations for storing data to be transferred to said plurality of prhipheral devices, said I/O system comprising:

digital computer means coupled to receive processing and test interrupt signals from said host computer for processing and distributing host computer supplied address, data and control signals to said plurality of external peripheral devices, memory means included in said digital computer means coupled to receive said address, data and control signals from said host computer for storage of said host computer supplied address, data and control signals to be transferred to said plurality of external peripheral devices, a device table in said memory means having a plurality of locations each location for storing a field which contains an address of a selected peripheral device and a function code which may be modified by said host computer during operation for specifying a sub-routine for processing said host computer supplied data by said digital computer means, a data buffer in said memory means having a plurality of locations paired with locations in said device table respectively for receiving address, data and control signals transferred in high speed bursts by said host computer, a device data block in said memory means having a plurality of locations corresponding to addresses in said device table, said locations in said data block being coupled to said external peripheral devices for the transfer of host computer supplied data processed by said digital computer means, and a plurality of I/O modules each including an address circuit for coupling to said device data block locations in said memory means.

2. An input/output (I/O) system as recited in claim 1 further including an I/O system interface means for coupling said host computer to said digital computer means, said I/O interface means configurable to interface selected host computers using high speed data burst transfer techniques to said digital computer means.

3. A method for transferring data from a memory of a host computer to selected external peripheral devices comprising the steps of:

pairing locations in a data buffer of an input/output (I/O) system with locations in a device table of said input/output (I/O) system, transferring in high speed bursts address, data and control signals from said memory of said host computer to said data buffer transmitting an output processing interrupt signal from said host computer to a digital computer means in said input/output (I/O) system causing said digital computer means to perform the following steps:

reading a first word in said device table causing said digital computer means to transfer and process data stored in a first paired location in said data buffer, said device table words capable of being modified by said host computer during system operation, transferring processed data to an address in a device block in said input/output (I/O) system, said address specified by said first word in said device table transferring said processed data from an address in said device block to a selected peripheral device continuing to read in turn each word in said device table causing said digital computer means to transfer and process data stored in each paired location of said data buffer, transferring said processed data to specified device block addresses for transfer to selected external perhipheral devices, after reading all words in said device table said digital computer means resumes processing input signals from said external peripheral devices until receipt of next output processing interrupt signal from said host computer.

* * * * *